(12) United States Patent
Chang et al.

(10) Patent No.: US 9,094,197 B2
(45) Date of Patent: *Jul. 28, 2015

(54) ADAPTIVE PAUSE TIME ENERGY EFFICIENT ETHERNET PHY

(71) Applicant: Micrel, Inc., San Jose, CA (US)

(72) Inventors: Wei-Chieh Chang, Los Gatos, CA (US);
Wei-Chi Lo, Fremont, CA (US);
Charng-Show Li, San Jose, CA (US);
Menping Chang, Cupertino, CA (US)

(73) Assignee: Micrel, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/571,543

(22) Filed: Dec. 16, 2014

(65) Prior Publication Data

US 2015/0163045 A1   Jun. 11, 2015

Related U.S. Application Data

(63) Continuation of application No. 13/106,471, filed on May 12, 2011, now Pat. No. 8,942,144.

(51) Int. Cl.
*H04L 5/16* (2006.01)
*H04L 12/18* (2006.01)

(52) U.S. Cl.
CPC .............. *H04L 5/16* (2013.01); *H04L 12/1881* (2013.01)

(58) Field of Classification Search
CPC ........................................................ H04L 5/16
See application file for complete search history.

(56) References Cited

U.S. PATENT DOCUMENTS

| | | | | |
|---|---|---|---|---|
| 6,724,725 B1* | 4/2004 | Dreyer et al. | ................. | 370/231 |
| 8,107,365 B2* | 1/2012 | Barrass | ................. | 370/229 |
| 8,156,359 B1* | 4/2012 | Sedarat et al. | ................. | 713/320 |
| 8,201,006 B2* | 6/2012 | Bobrek et al. | ................. | 713/323 |
| 8,392,637 B2* | 3/2013 | Diab et al. | ................. | 710/59 |
| 8,504,690 B2* | 8/2013 | Shah et al. | ................. | 709/226 |
| 2007/0248118 A1* | 10/2007 | Bishara et al. | ................. | 370/469 |
| 2009/0097390 A1* | 4/2009 | Diab et al. | ................. | 370/201 |
| 2009/0327506 A1* | 12/2009 | Diab | ................. | 709/230 |
| 2010/0023658 A1* | 1/2010 | Diab et al. | ................. | 710/59 |
| 2010/0128738 A1* | 5/2010 | Barrass | ................. | 370/445 |
| 2010/0262848 A1* | 10/2010 | Bobrek et al. | ................. | 713/320 |
| 2012/0030320 A1* | 2/2012 | Diab et al. | ................. | 709/220 |

FOREIGN PATENT DOCUMENTS

EP        2479924 A1 *  7/2012

* cited by examiner

*Primary Examiner* — Asad Nawaz
*Assistant Examiner* — Berhanu Belete
(74) *Attorney, Agent, or Firm* — Van Pelt, Yi & James LLP

(57) ABSTRACT

An energy efficient Ethernet physical layer (PHY) device including an EEE control module configured to generate a control signal to transition the PHY device into a low power consumption mode based an operating condition, and a pause frame generator module responsive to the control signals to generate a pause frame. The pause frame generator module is configured to send the pause frame to a media access control (MAC) device to reduce an incoming flow of data packets from the MAC device to the PHY device for a pause time duration. In operation, the pause frame generator module generates the pause frame including a pause time indicating the length of time for the PHY device to be in the low power consumption mode. The value of the pause time for each pause frame is determined adaptively based on the type of data traffic to be transmitted from the PHY device.

25 Claims, 3 Drawing Sheets

ADAPTIVE PAUSE TIME ENERGY EFFICIENT ETHERNET PHY

CROSS REFERENCE TO OTHER APPLICATIONS

This application is a continuation of co-pending U.S. patent application Ser. No. 13/106,471, entitled ADAPTIVE PAUSE TIME ENERGY EFFICIENT ETHERNET PHY filed May 12, 2011, which is incorporated herein by reference for all purposes.

FIELD OF THE INVENTION

The invention relates to Ethernet systems and, in particular, to a method and system for providing energy efficient Ethernet function in legacy products.

DESCRIPTION OF THE RELATED ART

The IEEE 802.3az standard, also known as Energy Efficient Ethernet (EEE), is a set of enhancements to the twisted-pair and backplane Ethernet networking standards that allows for less power consumption during periods of low data activity. The 802.3az standard was promulgated in the recognition that the utilization rate of network equipment is typically very low (1-10%) and that large amount of energy is wasted by network equipment that is powered on, but idle. The 802.3az standard defines mechanisms and protocols to reduce the energy consumption of network links during periods of low utilization by transitioning network interfaces into a low-power state.

More specifically, the 802.3az standard or EEE defines a low-power sleep state, called Low Power Idle (LPI), for reducing power consumption during periods of low link utilization. In legacy Ethernet standards, network links operate in an active idle state which requires the bulk of the circuitry to remain powered on, regardless of data transmission. LPI provides for powering down of most of the media access control (MAC) functions and some physical layer (PHY) functions for power savings during periods of low link utilization or high idle. However, EEE also provides for fast transitions back to active state from LPI for high performance data transmission. In operation, EEE allows for rapid wake up to transmit data as fast as possible and then return to the low power mode. In this manner, EEE reduces energy consumption without interrupting the network connection. EEE also provides for communication of energy-utilization information and control information between link partners to enable or disable energy-efficient modes without interrupting the network connection.

The 802.3az standard can be applied to reduce energy consumption in network-attached devices, such as network routers, switches, computers and printers. More specifically, the 802.3az standard is designed for Ethernet networks having physical layers implemented using 100 BASE-TX, 1000 BASE-T, and 10 GBASE-T, as well as backplane interfaces, such as 10 GBASE-KR.

EEE operates by using an EEE-enabled MAC device to initiate the energy saving functions defined in the 802.3az standard with an EEE-enabled PHY device. Accordingly, legacy MAC devices that are not designed to be compliant with the 802.3az standard are not able to implement EEE functions in a network device. There are a lot of non-EEE enabled MAC based products currently deployed or available in the market. These legacy MAC products cannot take advantage of the new 802.3az standard to reduce idle power consumption. It is not cost effective to replace all non-EEE MAC products with EEE-enabled MAC products. This is because MAC devices are typically implement as part of an integrated circuit, such being embedded in a processor integrated circuit or being embedded in a SOC (system-on-a-chip) integrated circuit. MAC devices are also embedded in a larger switch integrated circuit or a larger router integrated circuit. Therefore, it is often not feasible to update the design of the MAC to be compliant with the 802.3az standard.

SUMMARY OF THE INVENTION

According to one embodiment of the present invention, an energy efficient Ethernet physical layer device to be coupled to a media access control device includes an EEE control module configured to generate one or more control signals to transition the physical layer device into a low power consumption mode based on one or more operating conditions; and a pause frame generator module coupled to the EEE control module and responsive to the one or more control signals to generate a pause frame where the pause frame generator module is configured to send the pause frame to the associated media access control device to reduce an incoming flow of data packets from the media access control device to the physical layer device for a pause time duration. In operation, the pause frame generator module generates the pause frame including the pause time indicating the length of time for the physical layer device to be in the low power consumption mode where the value of the pause time for each pause frame is determined adaptively based on the amount of data traffic to be transmitted from the physical layer device.

Accordingly to another aspect of the present invention, a method in an energy efficient Ethernet physical layer device includes monitoring one or more operating conditions of the physical layer device indicating a need to transition the physical layer device into a low power consumption mode; generating one or more control signals to transition the physical layer device into the low power consumption mode based on the one or more operating conditions; generating a pause frame including a pause time in response to the one or more control signals where the pause time indicates the length of time for the physical layer device to be in the low power consumption mode and the value of the pause time for each pause frame is determined adaptively based on the amount of data traffic to be transmitted from the physical layer device; and transmitting the pause frame from the physical layer device to an associated media access control device to reduce an incoming flow of data packets from the media access control device to the physical layer device for the duration of the pause time.

The present invention is better understood upon consideration of the detailed description below and the accompanying drawings.

DETAILED DESCRIPTION OF THE PREFERRED EMBODIMENTS

In accordance with the principles of the present invention, an enhanced energy efficient Ethernet physical layer ("enhanced-EEE PHY") device generates a pause frame for a legacy media access control (MAC) device to cause the MAC device to reduce or cease transmission of data packets to allow the PHY device to enter a low power consumption state. The enhanced-EEE PHY device may further send the pause frame to its link partner to cause the link partner to reduce or cease transmission of data packets. In this manner, the enhanced-EEE PHY device may realize half-duplex or full-duplex low power consumption during periods of low link utilization. In particular, the enhanced-EEE PHY device generates a pause frame having a pause time defining the duration for remaining in the low power consumption mode. In embodiments of the present invention, the pause time is adaptively determined based on the data traffic pattern and/or the data packet type at the enhanced-EEE PHY device. In some embodiments, the enhanced-EEE PHY device applies one or more algorithms to optimize the time spent in the active mode and in the low power consumption mode based on the data traffic pattern and/or data packet type and/or based on user settings.

In embodiments of the present invention, the enhanced-EEE PHY device determines the pause time and active time values based on the data traffic pattern and the pause time and active time values are periodically updated to improve the energy efficient functions. In some embodiments, the pause and active time values are computed using software and provided to the enhanced-EEE PHY device. In other embodiments, the enhanced-EEE PHY device uses hardware such as registers and state machine to compute and update the pause time and active time values.

The enhanced-EEE physical layer device, with software-assisted pause time determination in some embodiments, provides a low cost alternative to implementing the Energy Efficient Ethernet 802.3az standard, particularly in network equipment incorporating non-EEE compliant MAC devices. The enhanced-EEE physical layer device is configured to initiate energy efficient functions without relying on the MAC device. Since most of the power consumption in network equipment is at the PHY device, the network equipment can achieve appreciable energy saving by just making the PHY device itself energy efficient.

Figure 1:
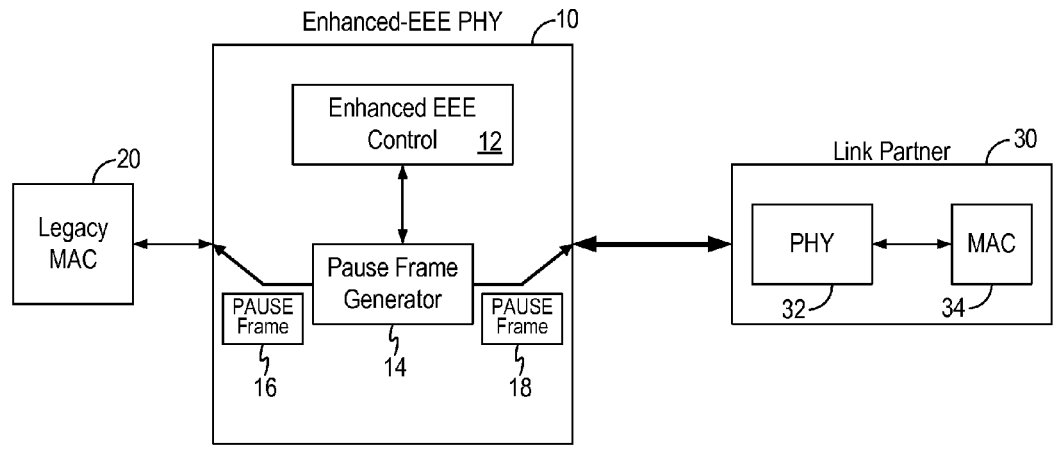
FIG. 1 is a functional block diagram of an enhanced-EEE physical layer device in a network environment according to one embodiment of the present invention.

FIG. 1 is a functional block diagram of an enhanced-EEE physical layer device in a network environment according to one embodiment of the present invention. Referring to FIG. 1, an enhanced energy efficient Ethernet physical layer ("enhanced-EEE PHY") device 10 is connected to and associated with a media access control (MAC) device 20. The enhanced-EEE PHY device (also referred to as "PHY device") 10 communicates with the MAC device 20 to receive transmit data packets for transmission to a link partner 30 and also to provide receive data packets received from the link partner 30. In the present illustration, MAC device 20 is a legacy MAC device. That is, MAC device 20 is not designed to be compliant with the IEEE 802.3az standard for energy efficient Ethernet implementation. The link partner 30 also includes a physical layer (PHY) device 32 and a media access control (MAC) device 34 which may or may not be compliant with the 802.3az standard. The exact implementation of the MAC device in the link partner is not critical to the practice of the present invention.

According to embodiments of the present invention, the enhanced-EEE PHY device 10 incorporates enhanced energy efficient Ethernet functions to enable the PHY device to initiate a low power consumption mode without relying on instructions or control from the MAC device. In the present embodiment, the enhanced-EEE PHY device 10 includes an enhanced energy efficient Ethernet (EEE) control module 12 configured to generate control signals for a pause frame generator module 14. The enhanced EEE control module 12 operates on predetermined energy efficient control policy to determine when the PHY device 10 should enter a low power consumption mode. In the low power consumption mode, the PHY device 10 powers down some of its circuitry to reduce energy usage. In particular, the PHY device 10 may power down the transmit circuit, or the receive circuit, or both. In one embodiment, the low power consumption mode is the Low Power Idle (LPI) mode as defined by the 802.3az standard.

In response to the control signals from the enhanced EEE control module 12, the pause frame generator 14 generates a pause frame 16 and transmits the pause frame to the MAC device 120. In one embodiment, the pause frame is an IEEE 802.3x PAUSE frame. In conventional network equipments, a PHY device receives the PAUSE frame from its link partner to inform the PHY device to stop transmission of data packets. The PHY device forwards the PAUSE frame to the MAC device to cause the MAC device to cease further transmission. In accordance with embodiments of the present invention, the PHY device 10 generates a pause frame 16 itself and transmit the pause frame to its associated MAC device. The MAC device 20, upon receiving the pause frame 16, acknowledges the pause frame and ceases further transmission. In this manner, PHY device 10 may enter a low power consumption mode by powering down its transmit circuit (not shown). Half-duplex low-power idle is thus realized.

In embodiments of the present invention, the pause frame generator 14 may further transmit a pause frame 18 to the link partner 30. The link partner 30, in response to the pause frame 18, ceases further transmission. In this manner, PHY device 10 may enter a low power consumption mode by powering down its transmit circuit and its receive circuit (not shown). Full-duplex low-power idle is thus realized.

Figure 2A:
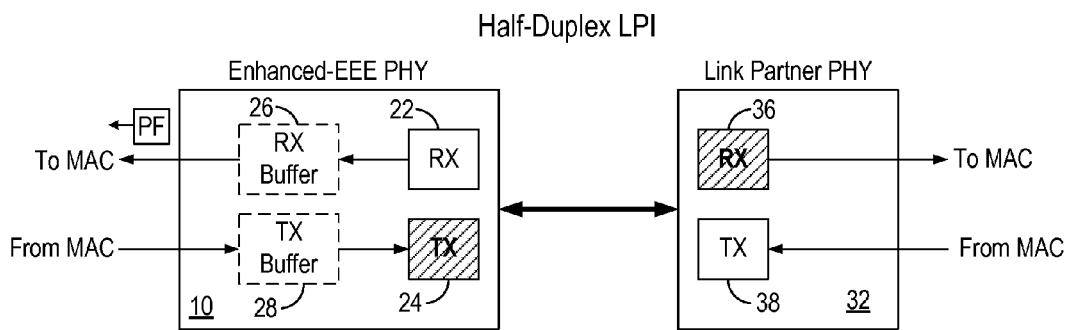
FIGS. 2(a) and 2(b) illustrate the operations of the low-power idle mode in half-duplex and in full-duplex, respectively, according to embodiments of the present invention.
Figure 2B:
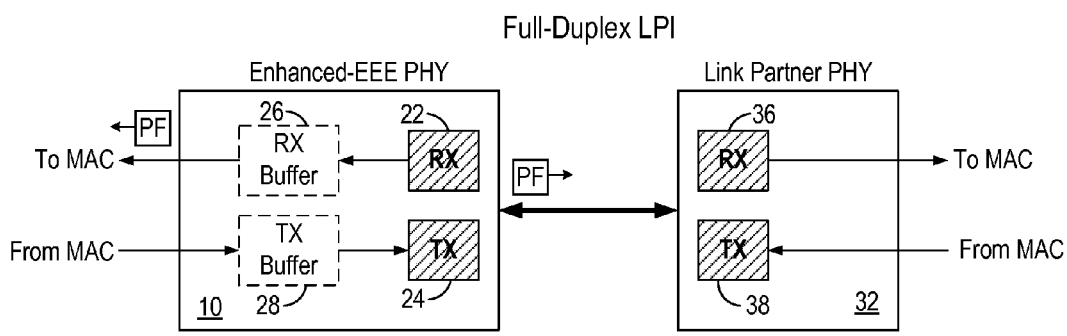

FIGS. 2(a) and 2(b) illustrate the operations of the low-power idle mode in half-duplex and in full-duplex, respectively, according to embodiments of the present invention. Referring to FIGS. 2(a) and 2(b), the enhanced-EEE PHY device 10 is typically constructed with a receive circuit 22 for receiving incoming data packets from a link partner and a transmit circuit 24 for transmitting outgoing data packets to the link partner. In the present illustration, the physical layer device 32 of the link partner is also illustrated as including a receive circuit 36 and a transmit circuit 38.

FIG. 2(a) illustrates the low-power idle mode in half-duplex operation. In the present embodiment, the enhanced-EEE PHY device 10 generates a pause frame which was sent to the associated MAC device to halt further transmission of data traffic. When the MAC device acknowledges receipt of the pause frame, the enhanced-EEE PHY device 10 may then power down its transmit circuit 24, shown as shaded, to enter the LPI mode. Enhanced-EEE PHY device 10 will cease from transmitting data packets to its link partner but may continue to receive incoming data packets on the receive circuit 22. Accordingly, a low power consumption level at the PHY device 10 is achieved by powering off at least the transmit circuit 24 and its associated supporting circuitry. When the link partner detects no incoming traffic from PHY device 10, the link partner may power down it's receive circuit 36, show as shaded, under the energy efficient control policy that the link partner may has implemented.

FIG. 2(b) illustrates the low-power idle mode in full-duplex operation. In the present embodiment, the enhanced-EEE PHY device 10 generates a pause frame which was sent to the associated MAC device to halt further transmission of data traffic. When the MAC device acknowledges receipt of the pause frame, the enhanced-EEE PHY device 10 may then power down its transmit circuit 24, shown as shaded, to enter the LPI mode. Furthermore, the enhanced-EEE PHY device 10 sends a pause frame to the link partner to cause the link partner to cease transmission of data packets. Accordingly, the enhanced-EEE PHY device 10 may then power down its receive circuit 22, shown as shaded, to enter the LPI mode. In this manner, a full-duplex low power consumption is realized at the PHY device 10 with both the receive circuit 22 and the transmit circuit 24, and their associated supporting circuitry, being powered off. When the PHY device 10 is in full-duplex LPI, the PHY device 10 will cease from transmitting data packets to its link partner and the PHY device 10 have also informed the link partner to pause from transmitting data packets. The link partner may power down it's receive circuit 36 and also the transmit circuit 38, show as shaded, under the energy efficient control policy that the link partner may has implemented.

When the enhanced-EEE PHY device 10 sends a pause frame to the associated MAC device, the MAC device may, at that moment, be sending outgoing or transmit data packets to the PHY device. In one embodiment, these mid-stream transmission are dropped and the transmit data packets are discarded. These outgoing data packets may be retransmitted when the enhanced-EEE PHY device 10 exits the low power consumption mode. Similarly, when the enhanced-EEE PHY device 10 enters the low power consumption mode, its link partner may be in the midst of transmitting data packets to the PHY device. In one embodiment, these mid-stream transmission are dropped and the receive data packets are ignored. The link partner will retransmit these packets at a later time when it did not receive acknowledgement of receipt from the PHY device.

In alternate embodiments of the present invention, the enhanced-EEE PHY device 10 includes buffers to store mid-stream transmission when the pause frame is being generated and sent to the MAC device and/or the link partner. In the embodiments shown in FIGS. 2(a) and 2(b), the enhanced-EEE PHY device 10 further includes a receive buffer (RX Buffer) 26 and a transmit buffer (TX Buffer) 28 coupled to the receive circuit 22 and the transmit circuit 24, respectively. When the enhanced-EEE PHY device 10 generates a pause frame to the MAC device to cease further transmission (FIGS. 2(a) and 2(b)), the link partner may still be sending data packets mid-stream to PHY device 10. The receive buffer 26 is configured to store these receive data packets from the link partner before the receive circuit 22 is powered down. When the PHY device 10 returns to the active mode, the stored receive packets in RX Buffer 26 may then be forwarded to the MAC device without requiring the link partner to resend the data packets.

Figure 3:
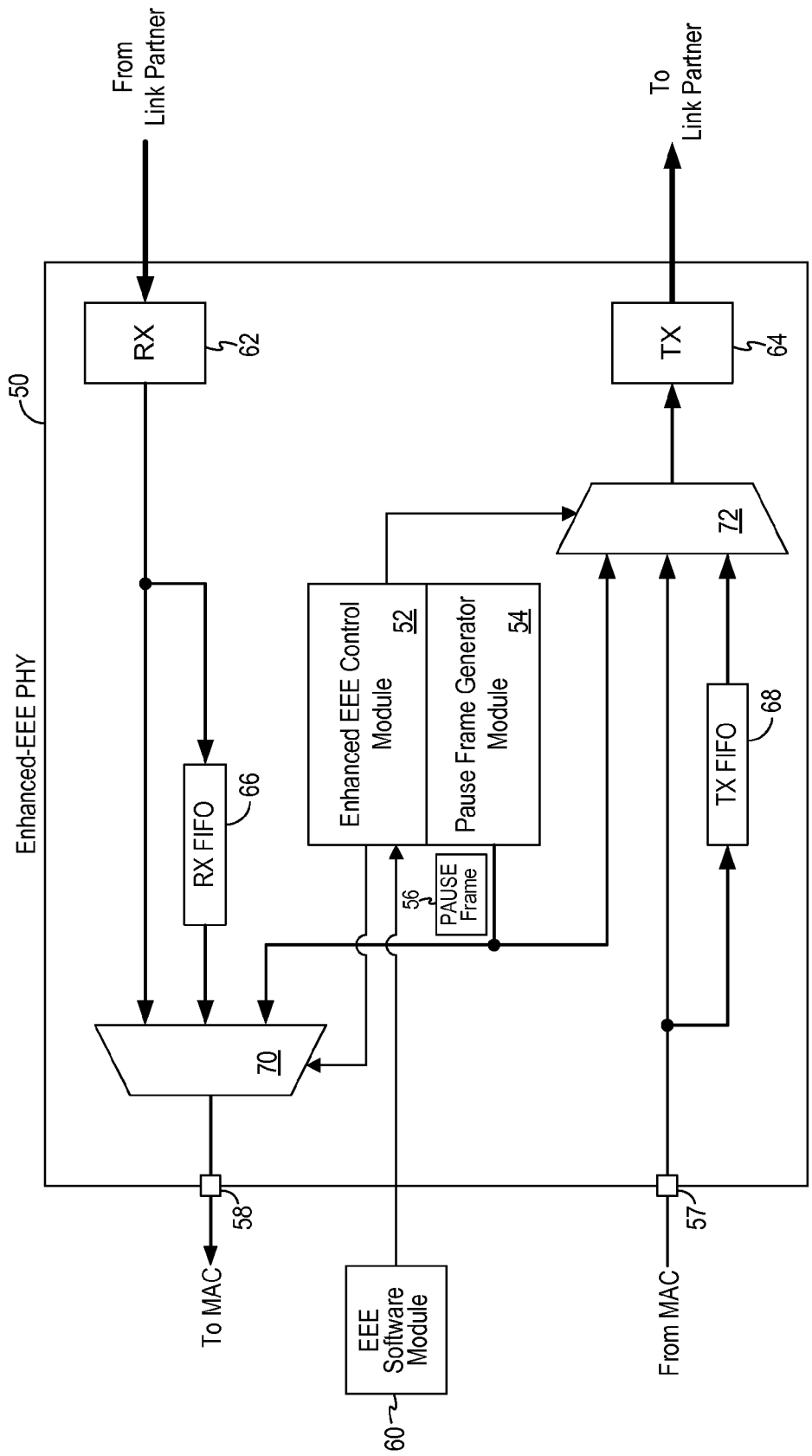
FIG. 3 is a schematic diagram of an enhanced-EEE PHY device according to one embodiment of the present invention.

On the other hand, when the enhanced-EEE PHY device 10 generates a pause frame to the link partner to cease further transmission in a full-duplex mode (FIG. 2(b)), the MAC device associated with the PHY device 10 may be transmitting outgoing data packets to the ink partner mid-stream. In that case, the transmit buffer 28 is configured to store these transmit data packets before the transmit circuit 24 is powered down. When the PHY device 10 returns to the active mode, the stored transmit packets in TX Buffer 28 may then be sent to the link partner without requiring the MAC device to resend the data packets. RX buffer 26 and TX buffer 28 are optional and may be omitted in other embodiments of the present invention FIG. 3 is a schematic diagram of an enhanced-EEE PHY device according to one embodiment of the present invention. Referring to FIG. 3, an enhanced-EEE PHY device 50 (also referred to as "PHY device 50") includes a receive circuit 62 for receiving receive data packets from a link partner and a transmit circuit 64 for transmitting transmit data packets to the link partner. The PHY device 50 also includes input and output ports 57, 58 for coupling to a MAC device. The PHY device 50 forwards receive data packets to the MAC device on the output port 58 and receives transmit data packet from the MAC device on the input port 57. FIG. 3 illustrates only components of the physical layer device that are relevant to the energy efficient functions. It is understood that PHY device 50 includes other components not shown in FIG. 3 to facilitate the normal operation of the physical layer device.

PHY device 50 includes an enhanced EEE control module 52 configured to implement control policy for initiating energy efficient Ethernet functions in the physical layer device. More specifically, enhanced EEE control module 52 monitors the operating conditions of the PHY device 50 to determine if there is a need to transition to a low power consumption mode. A nature of Ethernet network is that data packets are sent in bursts that are often seconds to hours apart. Thus, the PHY device 50 may experience periods of activities with long periods of idle time in between. The enhanced EEE control module 52 may monitor the transmit data traffic and/or the receive data traffic to determine if the PHY device 50 is in an idle state. In one embodiment, the enhanced EEE control module 52 collect information in the MIB (Management Information Base) from the MAC device. The enhanced EEE control module 52 may monitor counters in the MIB to determine the data traffic condition of the PHY device 50. In response to the data traffic condition at the PHY device 50, the enhanced EEE control module 52 generates one or more control signals to transition the PHY device 50 to the low power consumption mode.

In operation, the enhanced EEE control module 52 determines a set of time values for controlling the energy efficient function of the PHY device 50. The time values include a pause time value indicative of the duration for the physical layer device to be in the low power consumption mode. The time values further include an active time value indicative of the length of time for which the physical layer device is to remain in an active mode. In the present description, the low power consumption mode refers to an operation mode where the physical layer device powers down some of its circuitry to reduce energy usage. For example, the physical layer device may power down the transmit circuit and/or the receive circuit, and/or the associated circuitry. In one embodiment, the low power consumption mode is the Low Power Idle (LPI) mode as defined by the 802.3az standard. In the present description, the active mode refers to an operation mode where the physical layer device is completely powered up for supporting transmission and reception of data packets. The determination of the different time values, including the pause time value and the active time value used in the energy efficient functions of PHY device 50 will be described in more detail below.

PHY device 50 further includes a pause frame generator module 54 configured to generate a pause frame 56 in response to the control signals from the enhanced EEE control module 52. The pause frame generator module 54 sends the pause frame 56 to the output port 58 (through a multiplexer 70) to be forwarded to the MAC device to cause the MAC device to reduce or cease transmitting outgoing data packets to the PHY device 50. In embodiments of the present invention, the pause frame 56 includes the pause time value indicative of the length of time for the PHY device 50 to be in the low power consumption mode. In some embodiments, the pause time value is determined adaptively based on the data traffic pattern. In one embodiment, the pause time value is determined adaptively based on the amount of data traffic to be transmitted from the PHY device 50. In other embodiments, the pause time value may be determined adaptively based on the type of data packets. After sending the pause frame to the MAC device, the PHY device 50 may then enter the low power consumption mode by powering off at least the transmit circuit 64. The circuitry associated with the transmit circuit 64 may also be powered off to further reduce power consumption.

In some embodiments of the present invention, the pause frame generator module 54 also sends the pause frame 56 to the transmit circuit 64 (through a multiplexer 72) to be forwarded to the link partner. The PHY device 50 thus informs the link partner to cease transmission of data packets and the PHY device 50 may enter full-duplex low power consumption mode. The PHY device 50 may then power off the transmit circuit 64 as well as the receive circuit 62. The circuitry associated with the transmit circuit 64 and the receive circuit 62 may also be powered off to further reduce power consumption.

In the present embodiment, PHY device 50 further includes a receive buffer 66 implemented as a receive First-In-First-Out memory circuit ("RX FIFO") and a transmit buffer 68 implemented as a transmit First-In-First-Out memory circuit ("TX FIFO"). RX FIFO 66 and TX FIFO 68 are used to store data packets that are in the midst of transmission when the PHY device 50 sends the pause frame 56 to enter low power consumption mode. More specifically, the TX FIFO 68 is used to store transmit data packets received from the MAC device as the PHY device 50 sends the pause frame or just after sending the pause frame to a link partner. Similarly, the RX FIFO 66 is used to store receive data packets received from the link partner as the PHY device 50 sends the pause frame or just after sending the pause frame to the associated MAC device. The receive buffer 66 and the transmit buffer 68 are optional and may be omitted in other embodiments of the present invention.

PHY device 50 includes a multiplexer 70 to select one of three signals to be provided to the output port 58 for sending to the MAC device. The multiplexer 70 has a first input coupled directly to the receive circuit 62, a second input coupled to the output of the RX FIFO 66 and a third input coupled to the pause frame generator module 54. Thus, in operation, the multiplexer 70 can select the receive data packets from the receive circuit 62 when PHY device 50 is in the active mode. The multiplexer 70 can also select the output of RX FIFO 66 upon wake up of the PHY device 50 to retrieve the stored receive data packets, if any, sent prior to the recent low power consumption cycle. Finally, the multiplexer 70 can select the pause frame generated by the pause frame generator module 54. The multiplexer 70 operates under the control of the enhanced EEE control module 52 to select the appropriate input signals depending on the operation mode.

PHY device 50 further includes a multiplexer 72 to select one of three signals to be provided to the transmit circuit 64 for sending to the link partner. The multiplexer 72 has a first input coupled directly to the input port 57, a second input coupled to the output of the TX FIFO 68 and a third input coupled to the pause frame generator module 54. Thus, in operation, the multiplexer 72 can select the transmit data packets sent from the MAC device when PHY device 50 is in the active mode. The multiplexer 72 can also select the output of TX FIFO 68 upon wake up of the PHY device 50 to retrieve the stored transmit data packets, if any, sent prior to the recent low power consumption cycle. Finally, the multiplexer 72 can select the pause frame generated by the pause frame generator module 54. The multiplexer 72 operates under the control of the enhanced EEE control module 52 to select the appropriate input signals depending on the operation mode.

As described above, the enhanced EEE control module 52 determines a set of time values for controlling and operating the energy efficient functions of the PHY device 50. In the present embodiment, the set of time values include the pause time, the active time and a set of auxiliary time values. The set of auxiliary time values may include the minimum, the maximum, and the step-change (delta) of a given time value. For instance, the enhanced EEE control module 52 may determine a minimum active time, a maximum active time and a delta active time. The enhanced EEE control module 52 may also determine a minimum pause time, a maximum pause time and a delta pause time. The enhanced EEE control module 52 may further update the pause time and active time values based on the set of auxiliary time values.

In one embodiment, the enhanced EEE control module 52 performs the monitoring of operating conditions and calculating of time values in hardware, such as by using state machines and registers. According to alternate embodiments of the present invention, the enhanced EEE control module 52 is assisted by an EEE software module 60 in performing the control functions. In one embodiment, the EEE software module 60 operates to collect information relating to the operating condition of the PHY device 50. For instance, the EEE software module 60 may collect MIB information from the MAC device. The EEE software module 60 may further determine various time values, including the pause time and the active time values. The EEE software module 60 may then provide the pause time and active time values to the enhanced EEE control module 52 for controlling the energy efficient functions of the PHY device 50.

In one embodiment, the EEE software module 60 monitor the MIB counters in the MAC device and generates the set of time values, including the auxiliary time values, for determining the pause time and the active time. The EEE software module 60 may update the pause time and active time values based on the set of auxiliary time values. Alternately, the EEE software module 60 provides the set of auxiliary time values to the enhanced EEE control module 52 for the enhanced EEE control module 52 to determine the pause time and the active time for controlling the energy efficient functions of the PHY device 50.

Figure 4:
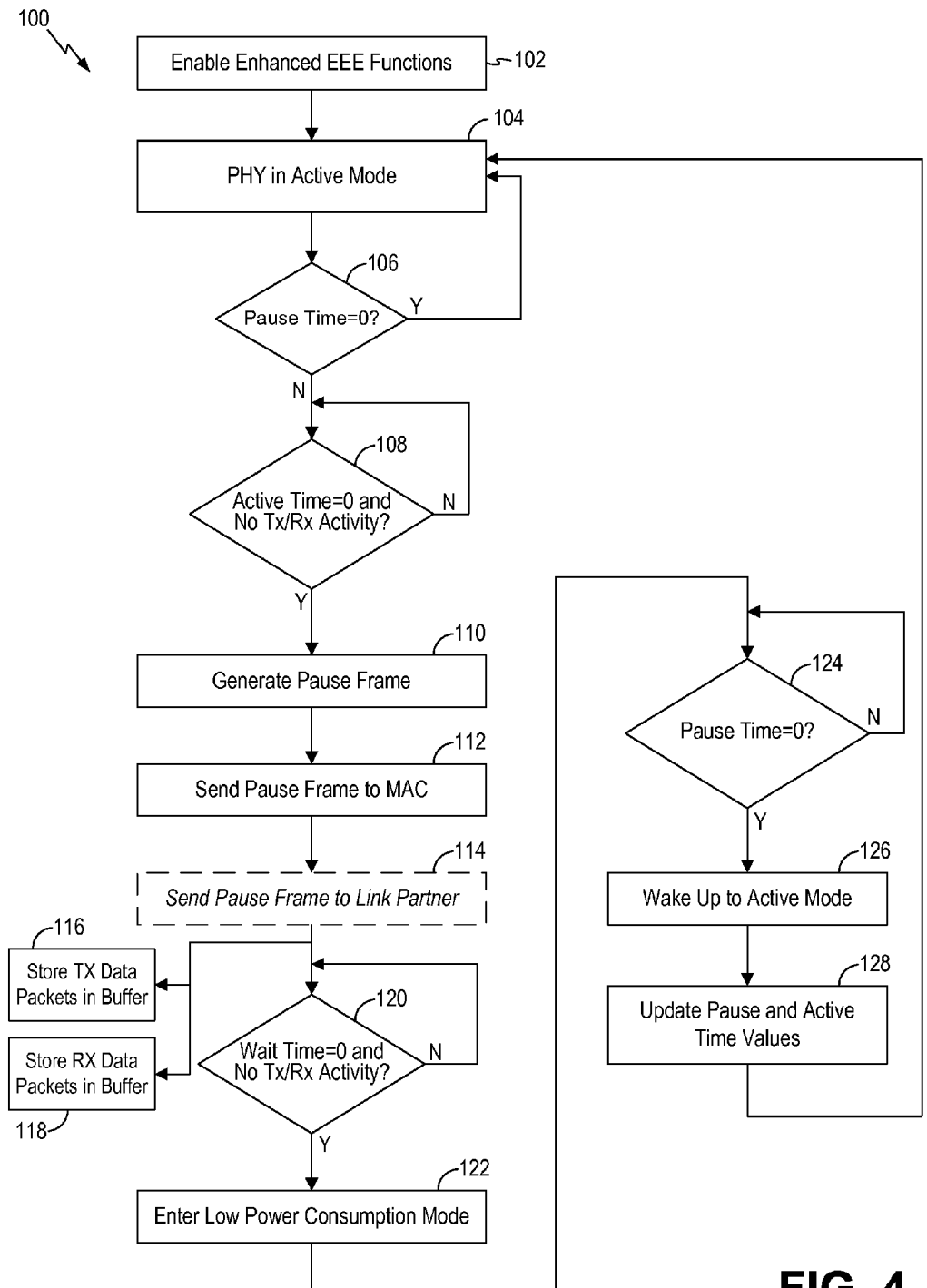
FIG. 4 is a flow chart illustrating an energy efficient Ethernet method implemented in an enhanced EEE physical layer device according to one embodiment of the present invention.

FIG. 4 is a flow chart illustrating an enhanced energy efficient Ethernet method implemented in an enhanced EEE physical layer device according to one embodiment of the present invention. The enhanced energy efficient Ethernet method 100 ("method 100") will be described with reference to the enhanced-EEE PHY device 50 in FIG. 3. Referring to FIG. 4, method 100 starts with enabling enhanced EEE functions in the PHY device 50 (step 102). In some embodiment, the PHY device 50 may be configured to allow the user to enable or disable the enhanced EEE functions. Alternately, the enhanced EEE functions may be permanently enabled. The option to enable or disable the enhanced EEE function is optional and may be omitted in other embodiments of the present invention. Furthermore, method 100 define a set of time values, including the active time, the pause time and a wait time. The time values are set by the enhanced EEE control module, such as through software. During the operation of method 100, the active time value, the pause time value and the wait time value are decremented from their preset values to zero, at which time, the time value is said to have expired.

Method 100 proceeds with the PHY device 50 operating in the active mode (step 104). While in active mode, method 100 determines if the pause time value has been set to 0 (step 106). The pause time value is determined by the enhanced EEE control module 52 or is determined by EEE software module 60 and then provided to enhanced EEE control module 52. A pause time value of 0 indicates that the PHY device should stay in the active mode. When the pause time value has a value other than zero, method 100 then proceeds to determine if the active time value has decremented to zero and there is no transmit or receive activity at the PHY device 50 (step 108). If the active time value has not decremented to zero or if there is transmit or receive activity, the PHY device remains in then active mode and method 100 waits at step 108. When the active time value has decremented to 0 and there is no transmit or receive activity, method 100 determines that the PHY device may proceed to the low power consumption mode. The enhanced EEE control module 52 generates control signals to instruct the pause frame generator module 54 to generate a pause frame (step 110).

The pause frame is sent to the MAC device (step 112). In some embodiments, method 100 may further optionally send the pause frame to the link partner (step 114). After sending the pause frame, method 100 waits for the duration of a wait time, which can be preset or adjusted adaptively by software. During the wait time, method 100 may optionally store incoming transmit data packets in a transmit buffer, such as TX FIFO 68 (step 116). Furthermore, method 100 may optionally store incoming receive data packets in a receiver buffer, such as RX FIFO 66 (step 118). These data packets are data packets that were sent in the midst of the PHY device sending the pause frame to the MAC device or to the link partner, as described above.

When the wait time expires (i.e., the wait time is decremented to zero) and there is no transmit and receive activity at the PHY device (step 120), method 100 proceeds to enter the low power consumption mode (step 122). In the low power consumption mode, the PHY device powers down the transmit circuit and/or the receive circuit and/or the associated circuitry to reduce power usage. Transmit data packets received from the MAC device are dropped in half-duplex or full-duplex mode and incoming receive data packets are ignored in full-duplex mode. The PHY device remains in the low power consumption mode for the duration of the pause time. When the pause time expires (step 124), i.e. the pause time is decremented to zero, the PHY device wakes up to the active mode (step 126) and begins transmit and receive activities, if any.

After a low power consumption cycle, method 100 proceeds to update the pause time value and the active time value (step 128). More specifically, the pause time and active time values are updated based on data traffic pattern. The pause time and active time values may also be updated based on user settings. In embodiments of the present invention, the energy efficient Ethernet method implements one or more algorithms to update the pause time and active time values, as will be described in more detail below. Method 100 then returns to step 104 where the PHY device is in active mode for transmitting and receiving data packets.

Pause Time and Active Time Algorithms

In conventional Ethernet systems, the PAUSE frame is sent with a fixed time duration. Then, to terminate the pause state, a pause frame with zero time duration is sent to the link partner. In accordance with embodiments of the present invention, the enhanced-EEE PHY device generates a pause frame with a pause time that is adaptively determined based on data traffic pattern and/or data packet type. More specifically, in embodiments of the present invention, the pause time during which the PHY device is in the low power consumption mode is dynamically controlled based on one or more control algorithms so as to optimize the operation of the PHY device.

According to one aspect of the present invention, the enhanced energy efficient Ethernet method of the present invention implements three control algorithms to determine the pause time and active time values. The three control algorithms include a conservative algorithm which maximizes the active time to ensure high network performance, an aggressive algorithm which maximizes the pause time to ensure high level of power saving, and a balanced algorithm which optimize the active time and pause time to optimize network performance and power conservation. The control algorithms may be implemented by the enhanced EEE control module in the enhanced-EEE PHY device. The control algorithms may also be implemented by the EEE software module with time values provided to the enhanced EEE control module in the software-assisted mode. The operation of each of the three control algorithms will be described below with reference to Tables 1 to 3.

As described above, the enhanced EEE control module, with or without software-assistance, generates a set of auxiliary time values and calculates or updates the pause time and the active time based on the set of auxiliary time values and the data traffic patterns. In the following description, the pause time, the active time and the set of auxiliary time values are denoted as follows:

$T_{LPI}$—Pause Time
$T_{LPI-Max}$—Maximum Pause Time
$T_{LPI-Min}$—Minimum Pause Time
$\Delta T_{LPI}$—Delta or step change in Pause Time
$T_{ACT}$—Active Time
$T_{ACT-Max}$—Maximum Active Time
$T_{ACT-Min}$—Minimum Active Time
$\Delta T_{ACT}$—Delta or step change in Active Time When the conservative control algorithm is applied, the active time is initially set to the maximum while the pause time is initially set to the minimum to optimize network performance. The active time and pause time are updated by decreasing the active time and increasing the pause time by the delta values when no transmit activity is detected after an active-pause-wake cycle. Table 1 below illustrates the initial time value settings and the equation for updating the time values when the conservative control algorithm is applied.

TABLE 1

Conservative Control Algorithm

| Initial Setting | Update Time Values |
| --- | --- |
| $T_{ACT} = T_{ACT-Max}$<br>$T_{LPI} = T_{LPI-Min}$ | When no transmit activity is detected after an Active-Pause-Wake Cycle:<br>$T_{ACT}(new) = Max(T_{ACT} - \Delta T_{ACT}, T_{ACT-Min})$<br>$T_{LPI}(new) = Min(T_{LPI} + \Delta T_{LPI}, T_{LPI-Max})$ |

More specifically, when the pause time $T_{LPI}$ and the active time $T_{ACT}$ are to be updated after a period of no transmit activity, the active time is decreased but only down to the minimum active time $T_{ACT-Min}$, while the pause time is increased but only up to the maximum pause time $T_{LPI-Max}$.

When the aggressive control algorithm is applied, the active time is initially set to the minimum while the pause time is initially set to the maximum to maximize power savings. The active time and pause time are updated by increasing the active time and decreasing the pause time by the delta values when transmit activity is detected during the active cycle. Furthermore, the active time and pause time are updated by setting to the initial settings when no transmit activity is detected after a wait-pause-wake cycle. Table 2 below illustrates the initial time value settings and the equation for updating the time values when the aggressive control algorithm is applied.

TABLE 2

Aggressive Control Algorithm

| Initial Setting | Update Time Values |
|---|---|
| $T_{ACT} = T_{ACT\text{-}Min}$<br>$T_{LPI} = T_{LPI\text{-}Max}$ | When transmit activity is detected during the Active Cycle:<br>$T_{ACT}(\text{new}) = \text{Min}(T_{ACT} + \Delta T_{ACT}, T_{ACT\text{-}Max})$<br>$T_{LPI}(\text{new}) = \text{Max}(T_{LPI} - \Delta T_{LPI}, T_{LPI\text{-}Min})$<br>When no transmit activity is detected after Wait-Pause/Wake-Cycle:<br>$T_{ACT}(\text{new}) = T_{ACT\text{-}Min}$<br>$T_{LPI}(\text{new}) = T_{LPI\text{-}Max}$ |

More specifically, when the pause time $T_{LPI}$ and the active time $T_{ACT}$ are to be updated after transmit activity is detected, the active time is increased but only up to the maximum active time $T_{ACT\text{-}Max}$, while the pause time is decreased but only down to the minimum pause time $T_{LPI\text{-}Min}$.

When the balanced control algorithm is applied, the active time is initially set to an average of the minimum and maximum active time values while the pause time is initially set to the average of the minimum and maximum pause time values. The balanced control algorithm operates to optimize network performance and power savings. The active time and pause time are updated by increasing the active time and decreasing the pause time by the delta values when transmit activity is detected during the active cycle. Furthermore, the active time and pause time are updated by decreasing the active time and increasing the pause time by the delta values when no transmit activity is detected after a wait-pause-wake cycle. Table 3 below illustrates the initial time value settings and the equation for updating the time values when the balanced control algorithm is applied.

TABLE 3

Balanced Control Algorithm

| Initial Setting | Update Time Values |
|---|---|
| $T_{ACT} = \text{Ave}(T_{ACT\text{-}Min}, T_{ACT\text{-}Max})$<br>$= 1/2(T_{ACT\text{-}Min} + T_{ACT\text{-}Max})$<br>$T_{LPI} = \text{Ave}(T_{LPI\text{-}Min}, T_{LPI\text{-}Max})$<br>$= 1/2(T_{LPI\text{-}Min} + T_{LPI\text{-}Max})$ | When transmit activity is detected during the Active Cycle:<br>$T_{ACT}(\text{new}) =$<br>$\text{Min}(T_{ACT} + \Delta T_{ACT}, T_{ACT\text{-}Max})$<br>$T_{LPI}(\text{new}) =$<br>$\text{Max}(T_{LPI} - \Delta T_{LPI}, T_{LPI\text{-}Min})$<br>When no transmit activity is detected after an Active-Pause-Wait Cycle:<br>$T_{ACT}(\text{new}) =$<br>$\text{Max}(T_{ACT} - \Delta T_{ACT}, T_{ACT\text{-}Min})$<br>$T_{LPI}(\text{new}) =$<br>$\text{Min}(T_{LPI} + \Delta T_{LPI}, T_{LPI\text{-}Max})$ |

More specifically, when the pause time $T_{LPI}$ and the active time $T_{ACT}$ are to be updated after transmit activity is detected, the active time is increased but only up to the maximum active time $T_{ACT\text{-}Max}$, while the pause time is decreased but only down to the minimum pause time $T_{LPI\text{-}Min}$. When the pause time $T_{LPI}$ and the active time $T_{ACT}$ are to be updated after a period of no transmit activity, the active time is decreased but only down to the minimum active time $T_{ACT\text{-}Min}$, while the pause time is increased but only up to the maximum pause time $T_{LPI\text{-}Max}$.

The enhanced energy efficient Ethernet method of the present invention provides three control algorithms to update the pause time and active time used in controlling the duration when the physical layer device is to stay active and the duration when the physical layer device is to stay in the low power consumption mode. The enhanced EEE control module can select one of the three control algorithms depending on the desired operating parameters to optimize. In one embodiment, the control algorithm is selected by user setting.

According to embodiments of the present invention, the enhanced energy efficient Ethernet method of the present invention uses the aforementioned control algorithms to update the pause time and active time based on the data packet type. Ethernet data packets include unicast data packets designated for specific destination addresses, multicast data packets designated for multiple destination addresses, and broadcast data packets designated for all destination addresses in the data network. In most situations, broadcast and multicast data packets are used as notification purpose, such as presence announcement, service availability announcement, and status summary. That is, broadcast and multicast data packets are typically used for housekeeping functions and are usually not user data traffic. According to embodiments of the present invention, the enhanced energy efficient Ethernet method of the present invention uses the aforementioned control algorithms to update the pause time and active time only when the transmit activity involves user data traffic. That is, the pause time and active time are increased or decreased only when the transmit activity involves unicast data packets. If the transmit activity involves only broadcast data packets or multicast data packets, then the control algorithms will not update the pause time or active time. In this manner, the enhanced energy efficient Ethernet method of the present invention updates the pause time and active time of the PHY device based on the type of data traffic, ensuring that the energy efficient operation is optimized for user traffic and not for routine housekeeping matter.

The above detailed descriptions are provided to illustrate specific embodiments of the present invention and are not intended to be limiting. Numerous modifications and variations within the scope of the present invention are possible. The present invention is defined by the appended claims.

We claim:

1. An energy efficient Ethernet (EEE) physical layer device for a wired Ethernet network equipment to be coupled to a media access control device, comprising:
    an EEE control module to generate one or more control signals to transition the physical layer device for a wired Ethernet network equipment into a low power consumption mode based on one or more operating conditions; and
    a pause frame generator module in communication with the EEE control module and to generate a pause frame including a pause time in response to the one or more control signals, the pause frame generator module to send the pause frame to the associated media access control device to reduce an incoming flow of data packets from the media access control device to the physical layer device for the duration of the pause time,
    wherein the pause frame generator module generates the pause frame comprising the pause time indicating the length of time for the physical layer device to be in the low power consumption mode, the value of the pause time for each pause frame being determined adaptively based on the type of data traffic to be transmitted from the physical layer device; and wherein the EEE control module generates a control signal for the pause frame generator module indicative of the pause time to be used with each pause frame, the value of the pause time being determined based on one or more algorithms defining a shorter or a longer time for the physical layer device to be in the low power consumption mode as a function of the type of data packet to be transmitted from the physical layer device.

2. The energy efficient Ethernet physical layer device of claim 1, wherein the EEE control module further generates a control signal to establish an active time being indicative of the length of time in which the physical layer device is to remain in an active mode, the active mode being an operation mode where the physical layer device is powered up for supporting transmission and reception of data packets, the value of the active time being determined adaptively based on the type of data packet to be transmitted from the physical layer device and a maximum duration in which the physical layer device is to remain in the active mode.

3. The energy efficient Ethernet physical layer device of claim 2, wherein the EEE control module further generates a control signal to establish a wait time being indicative of the length of time in which the physical layer device is to remain in an active mode after a pause frame is generated before entering the low power consumption mode.

4. The energy efficient Ethernet physical layer device of claim 3, wherein the EEE control module generates the control signals to determine the values of the pause time, the active time, and the wait time using hardware or software.

5. The energy efficient Ethernet physical layer device of claim 2, wherein the EEE control module generates values for the pause time and the active time based on a first algorithm operative to allocate initially more time for the active mode than the low power consumption mode, with the values of the pause time and the active time being updated to increase the pause time and to decrease the active time when no transmit activity is detected at the physical layer device after a recent low power consumption cycle.

6. The energy efficient Ethernet physical layer device of claim 2, wherein the EEE control module generates values for the pause time and the active time based on a second algorithm operative to allocate initially more time for the low power consumption mode than the active mode, with the values of the pause time and the active time being updated to increase the active time and to decrease the pause time when transmit activity is detected at the physical layer device during a recent active cycle, and being updated to allocate more time for the low power consumption mode than the active mode when no transmit activity is detected at the physical layer device after a recent low power consumption mode.

7. The energy efficient Ethernet physical layer device of claim 2, wherein the EEE control module generates values for the pause time and the active time based on a third algorithm operative to balance the time allocated for the low power consumption mode and the active mode, with the values of the pause time and the active time being updated to increase the active time and to decrease the pause time when transmit activity is detected at the physical layer device during a recent active cycle, and to increase the pause time and to decrease the active time when no transmit activity is detected at the physical layer device after a recent low power consumption cycle.

8. The energy efficient Ethernet physical layer device of claim 7, wherein the EEE control module set the pause time initially to an average of a maximum pause time and a minimum pause time and to set the active time initially to an average of a maximum active time and a minimum active time.

9. The energy efficient Ethernet physical layer device of claim 2, wherein the EEE control module further increases or decreases the pause time and active time when the data packet is an unicast data packet and the EEE control module keeps the pause time and the active time unchanged when the data packet is a broadcast data packet or a multicast data packet.

10. The energy efficient Ethernet physical layer device of claim 2, wherein the EEE control module further increases or decreases the pause time and active time when the data packet is associated with user data traffic and the EEE control module keeps the pause time and the active time unchanged when the data packet is associated with routine housekeeping matter.

11. The energy efficient Ethernet physical layer device of claim 1, wherein the pause frame comprises an IEEE 802.3x PAUSE frame.

12. The energy efficient Ethernet physical layer device of claim 1, wherein the physical layer device is to be coupled to a media access control device not designed to be compliant with energy efficient Ethernet.

13. The energy efficient Ethernet physical layer device of claim 1, wherein the physical layer device powers off a transmit circuit when the physical layer device enters the low power consumption mode.

14. The energy efficient Ethernet physical layer device of claim 1, wherein the pause frame generator module sends the pause frame to a link partner connected to the physical layer device to reduce an incoming flow of data packets from the link partner to the physical layer device for the duration of the pause time.

15. The energy efficient Ethernet physical layer device of claim 14, wherein the physical layer device powers off a receive circuit and a transmit circuit when the physical layer device enters the low power consumption mode.

16. The energy efficient Ethernet physical layer device of claim 14, further comprising:
a transmit buffer to store outgoing data packets received from the associated media access control device when the pause frame is being sent to the link partner.

17. The energy efficient Ethernet physical layer device of claim 1, further comprising:
a receive buffer to store incoming data packets received from a link partner connected to the physical layer device when the pause frame is being sent to the associated media access control device.

18. A method in an energy efficient Ethernet (EEE) physical layer device for a wired Ethernet network equipment, comprising:
monitoring one or more operating conditions of the physical layer device for a wired Ethernet network equipment indicating a need to transition the physical layer device into a low power consumption mode;
generating one or more control signals to transition the physical layer device into the low power consumption mode based on the one or more operating conditions;
generating a pause frame including a pause time in response to the one or more control signals, the pause time indicating the length of time for the physical layer device to be in the low power consumption mode, the value of the pause time for each pause frame being determined adaptively based on the type of data traffic to be transmitted from the physical layer device; and transmitting the pause frame from the physical layer device to an associated media access control device to reduce an incoming flow of data packets from the media access control device to the physical layer device for the duration of the pause time, wherein generating a pause frame including a pause time comprises determining a value of the pause time based on one or more algorithms defining a shorter or a longer time for the physical layer device to be in the low power consumption mode as a function of the type of data traffic to be transmitted from the physical layer device.

19. The method of claim 18, further comprising:

determining a value of an active time indicative of the length of time in which the physical layer device is to remain in an active mode, the active mode being an operation mode where the physical layer device is powered up for supporting transmission and reception of data packets, the value of the active time being determined adaptively based on the type of data traffic to be transmitted from the physical layer device and a maximum duration in which the physical layer device is to remain in the active mode.

20. The method of claim 19, further comprising:

determining a value of a wait time indicative of the length of time in which the physical layer device is to remain in an active mode after a pause frame is generated before entering the low power consumption mode.

21. The method of claim 19, wherein determining a value of the pause time and determining a value of an active time comprises:

generating values for the pause time and the active time based on a first algorithm operative to allocate initially more time for the active mode than the low power consumption mode; and updating the values of the pause time and the active time to increase the pause time and to decrease the active time when no transmit activity is detected at the physical layer device after a recent low power consumption cycle.

22. The method of claim 19, wherein determining a value of the pause time and determining a value of an active time comprises:

generating values for the pause time and the active time based on a second algorithm operative to allocate initially more time for the low power consumption mode than the active mode;

updating the values of the pause time and the active time to increase the active time and to decrease the pause time when transmit activity is detected at the physical layer device during a recent active cycle; and updating the values of the pause time and the active time to allocate more time for the low power consumption mode than the active mode when no transmit activity is detected at the physical layer device after a recent low power consumption mode.

23. The method of claim 19, wherein determining a value of the pause time and determining a value of an active time comprises:

generating values for the pause time and the active time based on a third algorithm operative to balance the time allocated for the low power consumption mode and the active mode;

updating the values of the pause time and the active time to increase the active time and to decrease the pause time when transmit activity is detected at the physical layer device during a recent active cycle;

updating the values of the pause time and the active time to increase the pause time and to decrease the active time when no transmit activity is detected at the physical layer device after a recent low power consumption cycle.

24. The method of claim 19, wherein determining a value of the pause time and determining a value of an active time further comprises:

increasing or decreasing the pause time and active time when the data packet is an unicast data packet; and keeping the pause time and the active time unchanged when the data packet is a broadcast data packet or a multicast data packet.

25. The method of claim 19, wherein determining a value of the pause time and determining a value of an active time further comprises:

increasing or decreasing the pause time and active time when the data packet is associated with user data traffic; and keeping the pause time and the active time unchanged when the data packet is associated with routine housekeeping matter.

* * * * *